US010809710B2

(12) United States Patent
Lee et al.

(10) Patent No.: US 10,809,710 B2
(45) Date of Patent: Oct. 20, 2020

(54) METHOD FOR CONTROLLING UNMANNED AERIAL VEHICLE AND ELECTRONIC DEVICE FOR CONTROLLING UNMANNED AERIAL VEHICLE

(71) Applicant: Samsung Electronics Co., Ltd., Suwon-si, Gyeonggi-do (KR)

(72) Inventors: Jong Kee Lee, Seoul (KR); Su Hyun Na, Seoul (KR); Tae Ho Wang, Seoul (KR); Choon Kyoung Moon, Suwon-si (KR); Eun Kyung Yoo, Seoul (KR); Olivia Lee, Seoul (KR); Hee Young Chung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 15/852,971

(22) Filed: Dec. 22, 2017

(65) Prior Publication Data

US 2018/0181116 A1   Jun. 28, 2018

(30) Foreign Application Priority Data

Dec. 27, 2016   (KR) ........................ 10-2016-0180262

(51) Int. Cl.
| | |
|---|---|
| *G05D 1/00* | (2006.01) |
| *G06F 3/0488* | (2013.01) |
| *H04N 7/18* | (2006.01) |
| *B64C 39/02* | (2006.01) |
| *G06F 3/0484* | (2013.01) |

(52) U.S. Cl.
CPC ......... *G05D 1/0016* (2013.01); *G05D 1/0038* (2013.01); *G06F 3/04847* (2013.01); *G06F 3/04883* (2013.01); *H04N 7/185* (2013.01); *B64C 39/024* (2013.01); *B64C 2201/108* (2013.01); *B64C 2201/127* (2013.01); *B64C 2201/146* (2013.01); *G06F 2203/04808* (2013.01)

(58) Field of Classification Search
USPC .......................................................... 701/2
See application file for complete search history.

(56) References Cited

U.S. PATENT DOCUMENTS

| | | | |
|---|---|---|---|
| 9,563,200 B2 | 2/2017 | Rischmuller et al. | |
| 2013/0176423 A1* | 7/2013 | Rischmuller | ...... H04N 5/23216 348/114 |

(Continued)

*Primary Examiner* — Tyler D Paige
(74) *Attorney, Agent, or Firm* — Jefferson IP Law, LLP

(57) ABSTRACT

An electronic device is provided that includes a communication circuit configured to transmit and receive wireless data with the unmanned aerial vehicle (UAV), a display configured to display a user interface (UI) for operating the UAV, a memory, and a processor electrically coupled with the communication circuit, the display, and the memory. The processor is configured to receive information about a direction of a first point of the UAV from the UAV, display a direction indication object corresponding to a direction of the first point on the display, in response to receiving a user input associated with movement or rotation of the UAV, generate a control signal for moving or rotating the UAV with respect to the first point in response to a location of the direction indication object and the user input, and transmit the generated control signal to the UAV using the communication circuit.

20 Claims, 17 Drawing Sheets

(56) References Cited

U.S. PATENT DOCUMENTS

| | | | |
|---|---|---|---|
| 2015/0149000 A1* | 5/2015 | Rischmuller | B64C 39/024 |
| | | | 701/7 |
| 2015/0341540 A1* | 11/2015 | Kim | H04N 5/23203 |
| | | | 348/144 |
| 2016/0117853 A1 | 4/2016 | Zhong et al. | |
| 2016/0191793 A1* | 6/2016 | Yang | H04N 5/23222 |
| | | | 348/207.11 |
| 2016/0357183 A1* | 12/2016 | Shaw | G05D 1/0027 |
| 2017/0060110 A1* | 3/2017 | Lee | G06F 1/1632 |
| 2017/0168481 A1* | 6/2017 | Flanigan | G05D 1/0022 |
| 2018/0024546 A1* | 1/2018 | Ha | G05D 1/0016 |
| | | | 701/2 |
| 2018/0046179 A1* | 2/2018 | Choi | G06F 3/017 |
| 2018/0181116 A1* | 6/2018 | Lee | G05D 1/101 |

* cited by examiner

METHOD FOR CONTROLLING UNMANNED AERIAL VEHICLE AND ELECTRONIC DEVICE FOR CONTROLLING UNMANNED AERIAL VEHICLE

CROSS-REFERENCE TO RELATED APPLICATION(S)

This application claims the benefit under 35 U.S.C. § 119(a) of a Korean patent application filed on Dec. 27, 2016 in the Korean Intellectual Property Office and assigned Serial number 10-2016-0180262, the entire disclosure of which is hereby incorporated by reference.

TECHNICAL FIELD

The present disclosure relates to a method for controlling an unmanned aerial vehicle (UAV) and an electronic device for controlling the UAV.

BACKGROUND

An unmanned aerial vehicle (UAV) (e.g., a drone) may be a device which flies by induction of radio waves without a human pilot aboard. The UAV may be used for delivering things and capturing photos or images as well as reconnaissance, surveillance, and the like.

The UAV may fly in response to a wireless control signal generated by a separate operation device. The UAV may change its altitude or may move or rotate, depending on a control signal of the operation device. If the UAV includes a camera device, it may capture photos or videos.

The above information is presented as background information only to assist with an understanding of the present disclosure. No determination has been made, and no assertion is made, as to whether any of the above might be applicable as prior art with regard to the present disclosure.

SUMMARY

To control an unmanned aerial vehicle (UAV) (or a drone device) by the related art, a joystick-type operation device or a touch button of a smartphone may be used. In this case, a user may generate a joystick input or a touch input to move or rotate a UAV to a desired location.

A method of operating the UAV by the related art may be a method of operating two joysticks in a complex manner to change an altitude of the UAV on a three-dimensional (3D) space or move or rotate the UAV. Since it is difficult for the operation method to match a movement direction of the UAV with a location of a user, it is difficult for the user to be skillful at an operation of the UAV. Further, if an image or video is captured using a camera mounted on the UAV, the operation method should accurately control an operation device to capture an image of composition the user wants.

Aspects of the present disclosure are to address at least the above-mentioned problems and/or disadvantages and to provide at least the advantages described below.

In accordance with an aspect of the present disclosure, an electronic device is provided. The electronic device includes a communication circuit configured to transmit and receive wireless data with the unmanned aerial vehicle (UAV), a display configured to display a user interface (UI) for operating the UAV, a memory, and a processor electrically coupled with the communication circuit, the display, and the memory. The processor may be configured to receive information about a direction of a first point of the UAV from the UAV, display a direction indication object corresponding to the direction of the first point on the display, in response to receiving a user input associated with movement or rotation of the UAV, generate a control signal for moving or rotating the UAV with respect to the first point in response to a location of the direction indication object and the user input, and transmit the generated control signal to the UAV using the communication circuit.

The method for controlling a UAV and the electronic device for controlling the UAV according to various embodiments of the present disclosure may intuitively control the UAV using a rod-type altitude adjustment UI and a circular movement/rotation UI.

The method for controlling a UAV and the electronic device for controlling the UAV according to various embodiments of the present disclosure may receive a head direction of the UAV and may display the received head direction on a screen, allowing a user to easily recognize a direction the UAV faces.

The method for controlling a UAV and the electronic device for controlling the UAV according to various embodiments of the present disclosure may allow the user to simply operate the UAV with his or her one hand.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
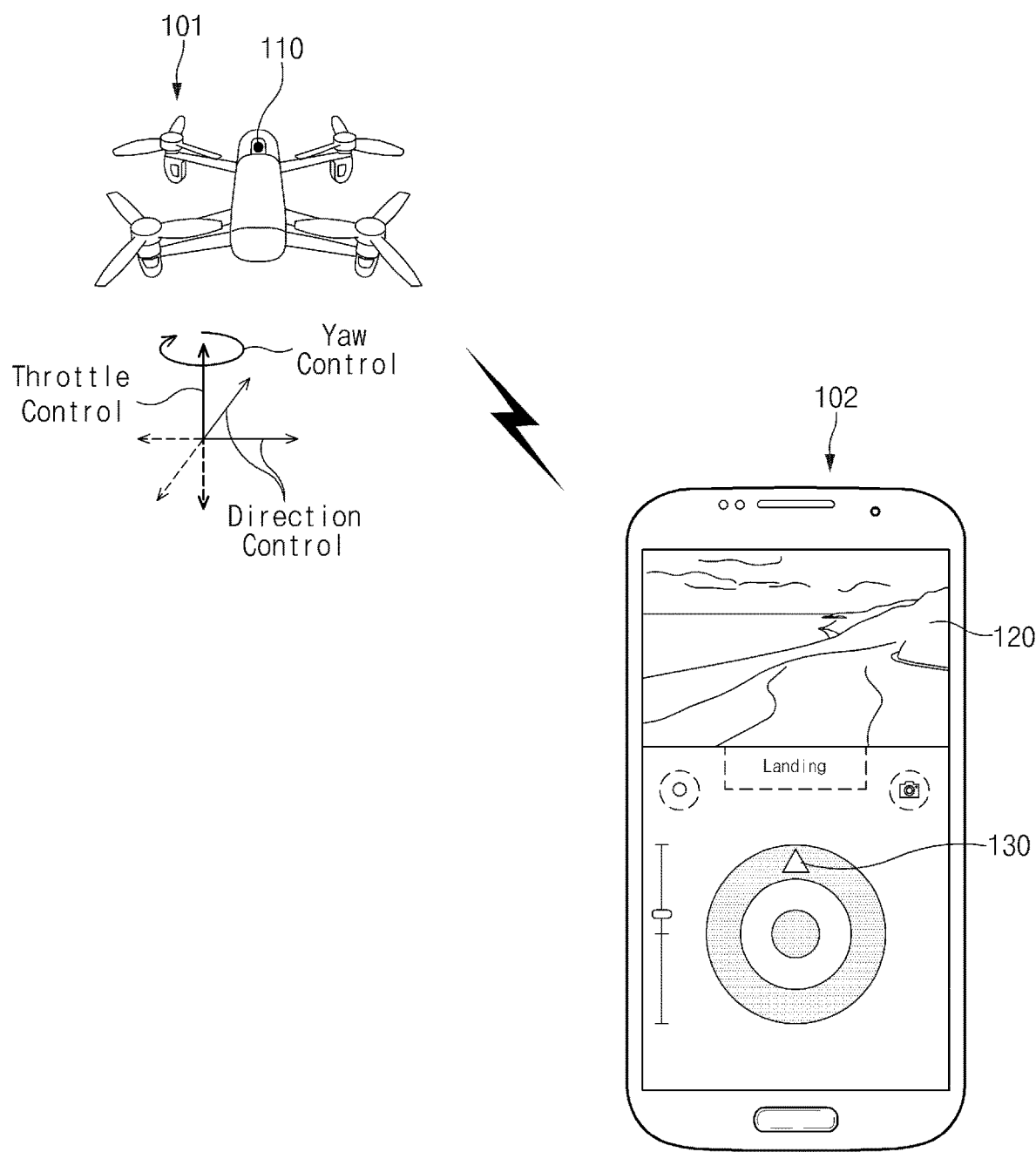
FIG. 1 is a drawing illustrating an unmanned aerial vehicle (UAV) and an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. central processing unit (CPU), for example, a "processor configured to (or set to) perform A, B, and C" may mean a dedicated processor (for example, an embedded processor) for performing a corresponding operation or a generic-purpose processor (for example, a CPU or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group phase 1 or phase 2 (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a drawing illustrating an unmanned aerial vehicle (UAV) and an electronic device according to various embodiments of the present disclosure. Hereinafter, an embodiment is exemplified as a UAV 101 is a drone device. However, embodiments are not limited thereto.

Referring to FIG. 1, the UAV 101 may be controlled through an electronic device (or a control device or an operation device) 102. The UAV 101 may perform "throttle" of changing its altitude, may perform "pitch & roll" of moving at the same altitude, or perform "yaw" of rotating at the same altitude, depending on a control signal generated by the electronic device 102. The UAV 101 may transmit and receive a signal according to a specified wireless communication mode (e.g., Bluetooth (BT), Wi-Fi, cellular communication, or the like) with the electronic device 102.

According to various embodiments, the UAV 101 may collect location information about a first point 110 rather than the center of the UAV 101. The first point (hereinafter referred to as "direction setting point") 110 may be a point used to determine a direction the UAV 101 faces.

For example, if the UAV 101 has a head, the direction setting point 110 may be the head or a point adjacent to the head. For another example, if the UAV 101 has a camera device, the direction setting point 110 may be a point where the camera device is mounted or a point adjacent to the camera device. For another example, the direction setting point 110 may be a point set by a user or a point preset in a manufacturing step. In another example, the direction setting point 110 may a point where a circuit such as an earth magnetic field sensor or a global positioning system (GPS) sensor is mounted.

Hereinafter, an embodiment is exemplified as the direction setting point 110 is a head location of the UAV 101. However, embodiments are not limited thereto.

According to various embodiments, the UAV 101 may transmit location information of the direction setting point 110 to the electronic device 102. For example, the location information of the direction setting point 110 may include information about an azimuth (e.g., an angle to a direction of due north), latitude, longitude, a tilt of the UAV 101, or the like. The electronic device 102 may output a direction indication object (hereinafter referred to as "direction indication") 130 corresponding to the direction setting point 110 on a display 120.

According to various embodiments, a camera device (not shown) may be mounted on the UAV 101. The UAV 101 may transmit image data collected by the camera device to the electronic device 102 or an external device a server) in real time.

The electronic device 102 may generate a control signal corresponding to a user input and may transmit the generated control signal to the UAV 101. The electronic device 102 may transmit the generated control signal to the UAV 101 using a communication module (or a communication circuit). The communication module (or the communication circuit) may perform wireless communication, such as BT, Wi-Fi, or cellular communication. In various embodiments, the electronic device 102 may be an electronic device (e.g., a smartphone, a table personal computer (PC), a smart watch, or the like) including the display 120.

According to various embodiments, the electronic device 102 may output a UI for controlling the UAV 101 on the display 120. The electronic device 102 may output a UI for "throttle" of changing an altitude of the UAV 101, "pitch & roll" of moving the UAV 101 at the same altitude, or "yaw" of rotating the UAV 101 at the same altitude. In an embodiment, the UI may include a straight rod slide button or a circular touch button.

In FIG. 1, an embodiment is exemplified as the UI is displayed through a touch button. However, embodiments are not limited thereto. For example, the UI may be implemented using a physical button, a sensor which recognizes an operation input of the user, or a bezel or a movable wheel (e.g., a joystick).

According to various embodiments, the electronic device 102 may output a direction indication 130 corresponding to the direction setting point 110 of the UAV 101 on at least part of the display 120. The electronic device 102 may receive location information of the direction setting point from the UAV 101. For example, the location information of the direction setting point 110 may include information about an azimuth (e.g., an angle to a direction of due north), latitude, longitude, a tilt of the UAV 101, or the like.

The electronic device 102 may compare a reference direction of the electronic device 102 (e.g., an upper direction of the display 120) with a direction of the direction setting point 110 to determine a location where the direction indication 130 will be output. A location of the direction indication 130 on the display 120 may be changed according to a direction the UAV 101 faces and a direction the user faces (or a direction an upper end of the electronic device 102 faces).

For example, if the UAV 101 faces a direction of due north and if the user holds the electronic device 102 in a portrait mode and faces the direction of due north, the direction indication 130 may be located to face an upper direction of the electronic device 102. If the direction the UAV 101 faces is changed to the northwest and if the direction the user (or the electronic device 102) faces is fixed, the direction indication 130 may rotate in a counterclockwise direction. On the other hand, if the direction the UAV 101 faces is fixed and if the direction the user (or the electronic device 102) faces is changed to the northeast, the direction indication 130 may also rotate in the counterclockwise direction.

If the direction setting point 110 is changed in direction according to movement or rotation of the UAV 101, the electronic device 102 may change a location of the direction indication 130 to correspond to a direction of the direction setting point 110.

In FIG. 1, an embodiment is exemplified as the direction indication 130 is shown in the form of a triangular point. However, embodiments are not limited thereto. For example, an icon for roughly representing a form of the UAV 101 may be displayed on part of the display 120. The icon may rotate in response to rotation of the UAV 101. The user may recognize a head direction of the UAV 101 through a form of the icon.

Additional information about the output of the direction indication 130 and the output of the user interface may be provided with reference to FIGS. 3 to 15.

Figure 2:
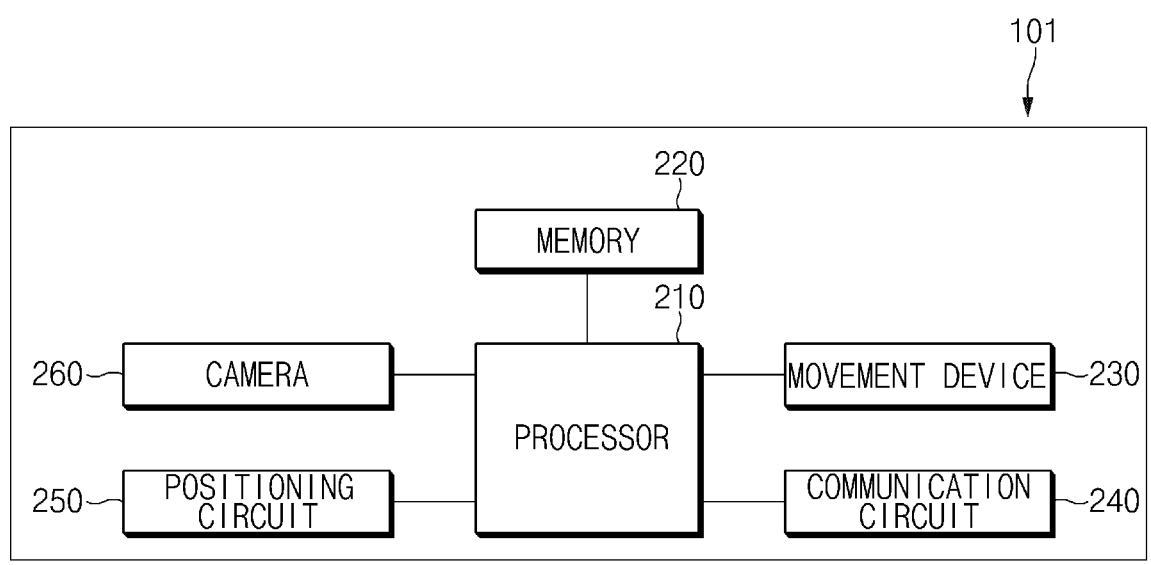
FIG. 2 is a block diagram illustrating a configuration of a UAV according to various embodiments of the present disclosure.

FIG. 2 is a block diagram illustrating a configuration of a UAV according to various embodiments of the present disclosure.

Referring to FIG. 2, a UAV 101 may include a processor 210, a memory 220, a movement device 230, a communication circuit 240, a positioning circuit 250, and a camera 260. In some embodiments, the UAV 101 may fail to include at least one of the elements or may further include another element.

The processor 210 may include one or more of a CPU, an application processor (AP), or a communication processor (CP). The processor 210 may execute, for example, an arithmetic operation or data processing about control and/or communication of at least one other element(s) of the UAV 101. The processor 210 may perform an arithmetic operation associated with moving the UAV 101 using the movement device 230, capturing an image using the camera 260, transmitting and receiving data with the electronic device 102 using the communication circuit 240, recognizing a location of the UAV 101 using the positioning circuit 250, or storing a captured image or location information.

The memory 220 may include a volatile and/or non-volatile memory. The memory 220 may store, for example, instructions or data associated with at least one other element(s) of the UAV 101.

According to various embodiments, the memory 220 may store an image captured using the camera 260, information about a location where each image is captured, and image capture setting information.

The movement device 230 may include at least one or more propellers protruded to the outside and a motor for supplying power to the propellers. The movement device 230 may drive the motor and the propellers depending on a control signal of the processor 210 to move the UAV 101 to a location according to the control signal.

The communication circuit 240 may establish communication between, for example, the UAV 101 and an electronic device 102 of FIG. 1. For example, the communication circuit 240 may transmit location information of a direction setting point 110 of FIG. 1 to the electronic device 102 through wireless communication (e.g., BT, Wi-Fi, or the like). Further, the communication circuit 240 may receive a control signal about a change in altitude, movement, or rotation from the electronic device 102 and may provide the received control signal to the processor 210.

The wireless communication may include at least one of, for example, Wi-Fi, BT, near field communication (NFC), a global navigation satellite system (GNSS), or cellular communication.

The positioning circuit 250 may detect information about a direction (e.g., an azimuth, a tilt, or the like) or a location (e.g., latitude, longitude, or the like) of the direction setting point 110. The positioning circuit 250 may include an acceleration sensor, a gyro sensor, an earth magnetic field sensor, a GPS sensor, or the like. The information collected by the positioning circuit 250 may be transmitted to the electronic device 102 via the communication circuit 240.

The camera 260 may capture an image depending on control of the processor 210. The captured image may be stored in the memory 220 or may be transmitted to the electronic device 102.

Figure 3:
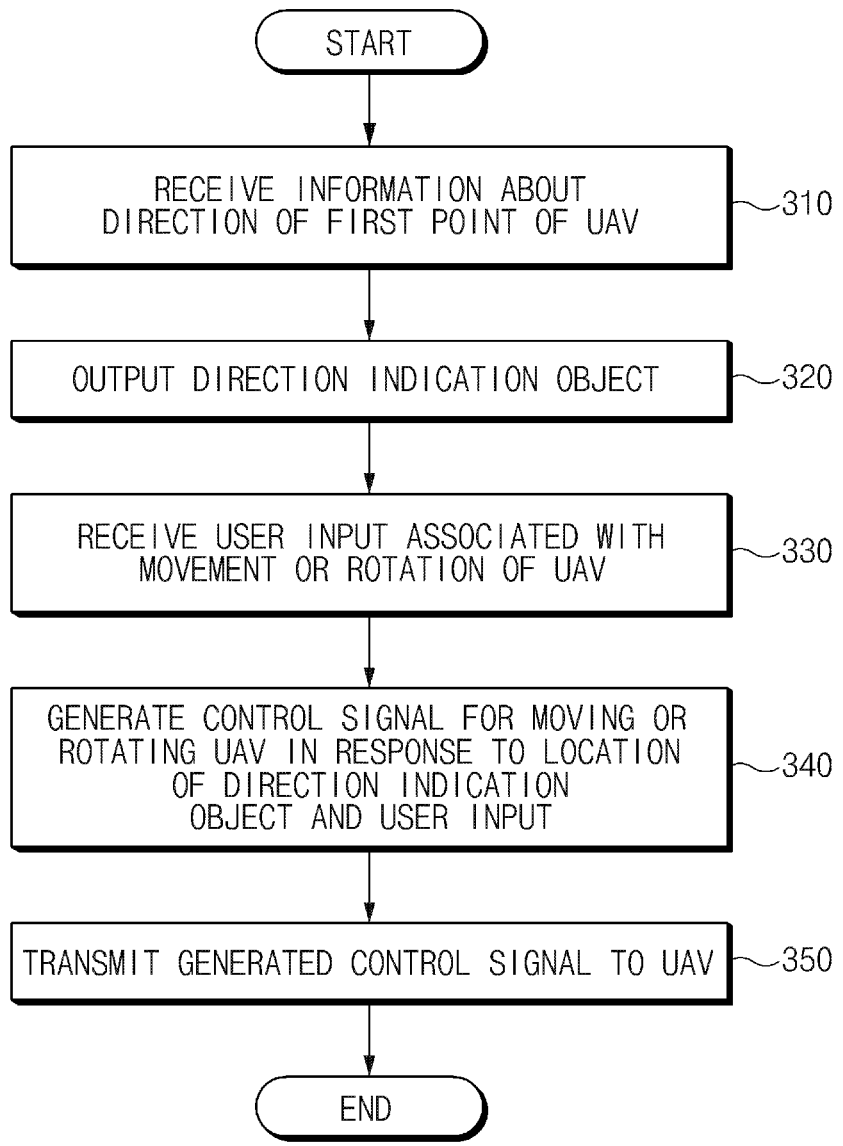
FIG. 3 is a flowchart illustrating an image capture method according to various embodiments of the present disclosure.

FIG. 3 is a flowchart illustrating an image capture method according to various embodiments of the present disclosure.

Referring to FIG. 3, in operation 310, a processor of an electronic device 102 may receive information about a direction of a first point (or a direction setting point) 110 of a UAV 101 of FIG. 1 via a communication circuit of the electronic device 102 from the UAV 101. The information may include information about an azimuth, latitude, longitude, a tilt, or the like.

In operation 320, the processor of the electronic device 102 may output a direction indication 130 corresponding to a direction of the direction setting point 110 on a display 120 of FIG. 1. For example, the direction indication 130 may be displayed as a graphic symbol such as a circle or a triangle or may be displayed as an icon of the UAV 101.

In operation 330, the processor of the electronic device 102 may receive a user input for moving or rotating the UAV 101. The electronic device 102 may display a UI (hereinafter referred to as "control interface"), for "throttle" of changing an altitude of the UAV 101, "pitch & roll" of moving the UAV 101 at the same altitude, or "yaw" of rotating the UAV 101 at the same altitude, on its display. A user may generate a control signal, for "throttle" of changing an altitude of the UAV 101, "pitch & roll" of moving the UAV 101 at the same altitude, or "yaw" of rotating the UAV 101 at the same altitude, through the control interface.

In operation 340, the processor of the electronic device 102 may generate a control signal for moving or rotating the UAV 101 in response to a location of the direction indication 130 and the user input. The control signal may include information about a location where a user input (e.g., a swipe input, a slide input, or a double tap input) occurs, a progress direction of the user input, a progress distance of the user input, a progress speed of the user input, a progress time of the user input, an end point of the user input, or an end time of the user input.

In operation 350, the processor of the electronic device 102 may transmit the generated control signal to the UAV 101. The UAV 101 may change its altitude or may move or rotate at the same altitude, based on the received control signal. The UAV 101 may move or rotate based on information included in the received control signal and a direction of the direction setting point 110.

According to various embodiments, a method for controlling a UAV includes receiving information about a direction of a first point of the UAV from the UAV, displaying a direction indication object corresponding to the direction of the first point on a display of an electronic device, receiving a user input associated with movement or rotation of the UAV, generating a control signal for moving or rotating the UAV with respect to the first point in response to a location of the direction indication object and the user input, and transmitting the generated control signal to the UAV.

According to various embodiments, the receiving of the user input comprises displaying a circular first UI, for controlling movement or rotation at the same altitude of the UAV, on the display, and receiving the user input on the first UI.

According to various embodiments, the receiving of the user input comprises displaying a circular UI, for controlling movement or rotation at the same altitude of the UAV, on the display, and receiving the user input on the first UI.

According to various embodiments, the displaying of the first UI on the display comprises outputting a direction UI for controlling movement at the same altitude of the UAV and a rotation UI of a circular band form which surrounds the direction UI.

Figure 4:
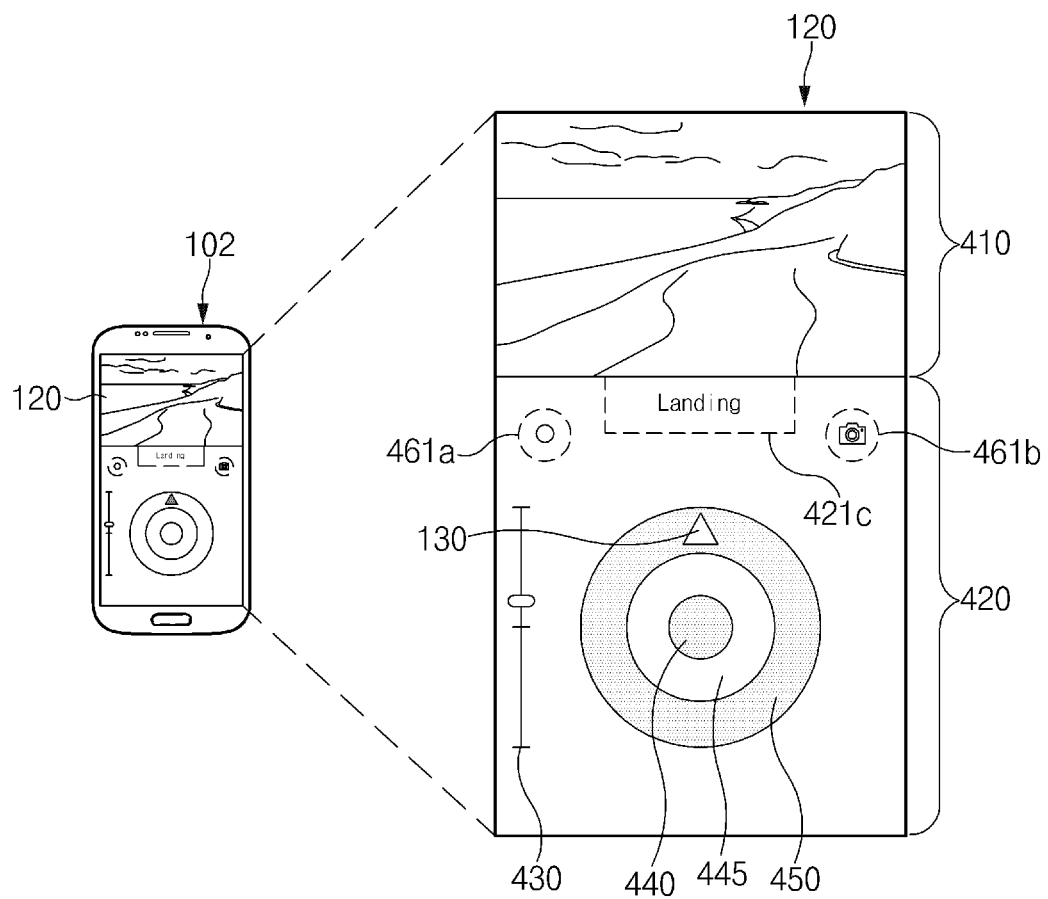
FIG. 4 is a drawing illustrating a display of an electronic device for controlling a UAV according to various embodiments of the present disclosure.

FIG. 4 is a drawing illustrating a display of an electronic device for controlling a UAV according to various embodiments of the present disclosure. FIG. 4 is, but is not limited to, an example.

Referring to FIG. 4, a display 120 of an electronic device 102 which controls a UAV 101 of FIG. 2 may include a capture image (or a live view) 410 and a control interface 420.

The capture image 410 may be an image collected using a camera 260 of the UAV 101. A user may move or rotate the UAV 101, while verifying an image captured using the camera 260 of the UAV 101.

The control interface 420 may include an interface (e.g., a movement bar or a touch button) associated with movement of the UAV 101, rotation of the UAV 101, or a change in an altitude of the UAV 101.

According to various embodiments, the control interface 420 may include an altitude UI 430, a direction UI 440, or a rotation UI 450. For example, the altitude UI 430 may have a straight rod form. Each of the direction UI 440 and the rotation UI 450 may have a circle or a circular band form. Additional information about an operation of the UAV 101 using the altitude UI 430, the direction UI 440, and the rotation UI 450 may be provided with reference to FIGS. 5 to 13.

According to various embodiments, in addition, the control interface 420 may include an interface (e.g., a video capture button 461a or a still image capture button 461b) associated with capturing a photo or a video, an interface (e.g., a landing button 421c) associated with starting/ending flight, or the like.

According to various embodiments, the control interface 420 may include a direction indication 130 for displaying a location corresponding to a direction setting point 110 of the UAV 101. In an embodiment, the direction indication 130 may be located on the inside of the rotation UI 450 or a point adjacent to the rotation UI 450.

As shown in FIG. 4, if the control interface 420 is output in a portrait mode, the user may operate the UAV 101 using his or her one hand. In FIG. 4, an embodiment is exemplified as the control interface 420 is output in the portrait mode. However, embodiments are not limited thereto. A control interface in a landscape mode may be provided with reference to FIG. 15.

Figure 5:
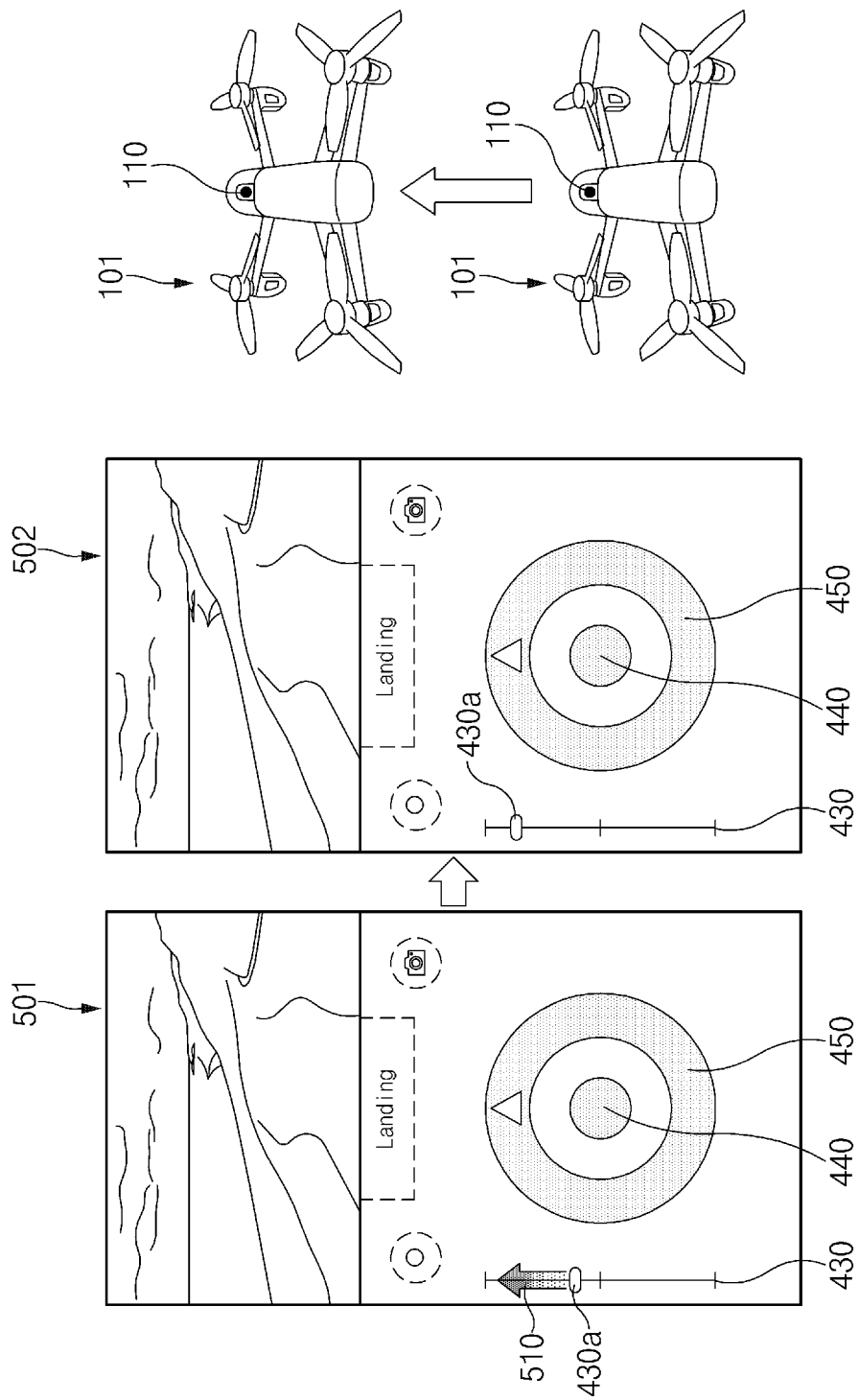
FIG. 5 is a drawing illustrating an operation of changing an altitude of a UAV according to various embodiments of the present disclosure.

FIG. 5 is a drawing illustrating an operation of changing an altitude of a UAV according to various embodiments of the present disclosure. FIG. 5 is, but is not limited to, an example.

Referring to FIG. 5, on a screen 501 and a screen 502, an altitude UI 430 may be located at a left side and a right side of a direction UI 440 and a rotation UI 450. In FIG. 5, an embodiment is exemplified as the altitude IR 430 is located at the left side of the direction UI 440 and the rotation UI 450. However, embodiments are not limited thereto.

The altitude UI 430 may have a straight rod form extended in an upper and lower direction. The altitude UI 430 may include a movement object 430a (or a movement bar). If the movement object 430a is moved in an upper and lower direction by a user input 510, information about a movement speed, a movement distance, or the like of the movement object 430a may be transmitted to the UAV 101.

The UAV 101 may change its altitude based on the information about the movement speed, the movement distance, or the like of the movement object 430a. For example, if the movement object 430a is moved to an upper side, the UAV 101 may control a movement device 230 (e.g., a propeller) of FIG. 2 to gain altitude. On the other hand, if the movement object 430a is moved to a low side, the UAV 101 may control the movement device 230 to lower altitude.

According to various embodiments, if the user input 510 occurs on the altitude UI 430 and does not occur on the direction UI 440 and the rotation UI 450, in a process of changing an altitude of the UAV 101, a direction a direction setting point 110 faces may be kept constant.

According to various embodiments, if the user input 510 is ended (e.g. if a touch input is ended), the UAV 101 may end the change in altitude and may maintain a hovering state.

According to various embodiments, if the change in the altitude of the UAV 101 according to the user input 510 is completed, the movement object 430a may return to the center of the altitude UI 430.

According to various embodiments, while the UAV 101 is changed in altitude, if a touch input occurs on another UI (e.g., the direction UI 440 or the rotation UI 450) by a multi-touch type, the UAV 101 may rotate or move while changed in altitude (e.g., rotation during an increase in altitude).

Figure 6:
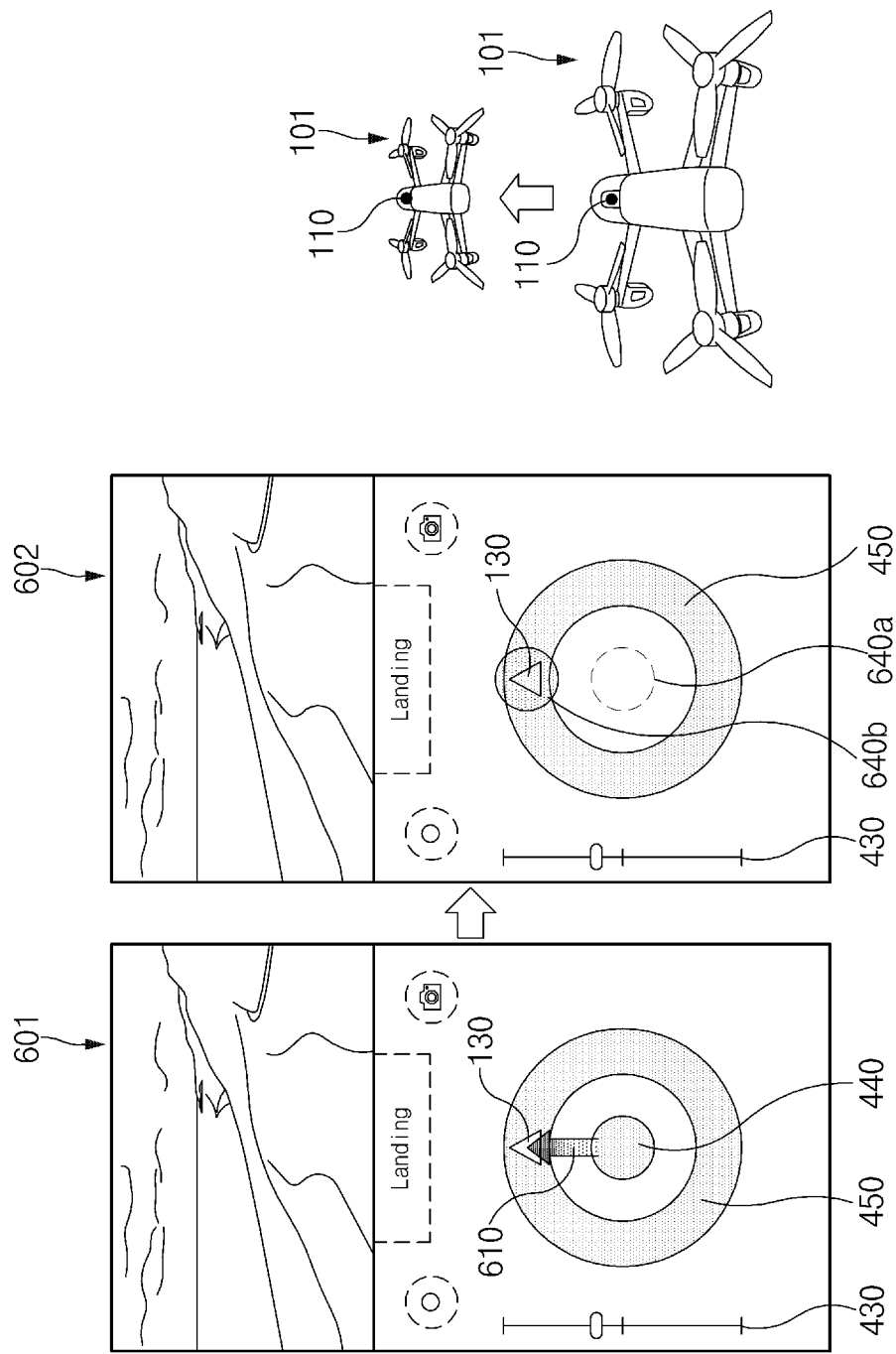
FIGS. 6, 7, and 8 are drawings illustrating an operation of moving a UAV at the same altitude according to various embodiments of the present disclosure.
Figure 7:
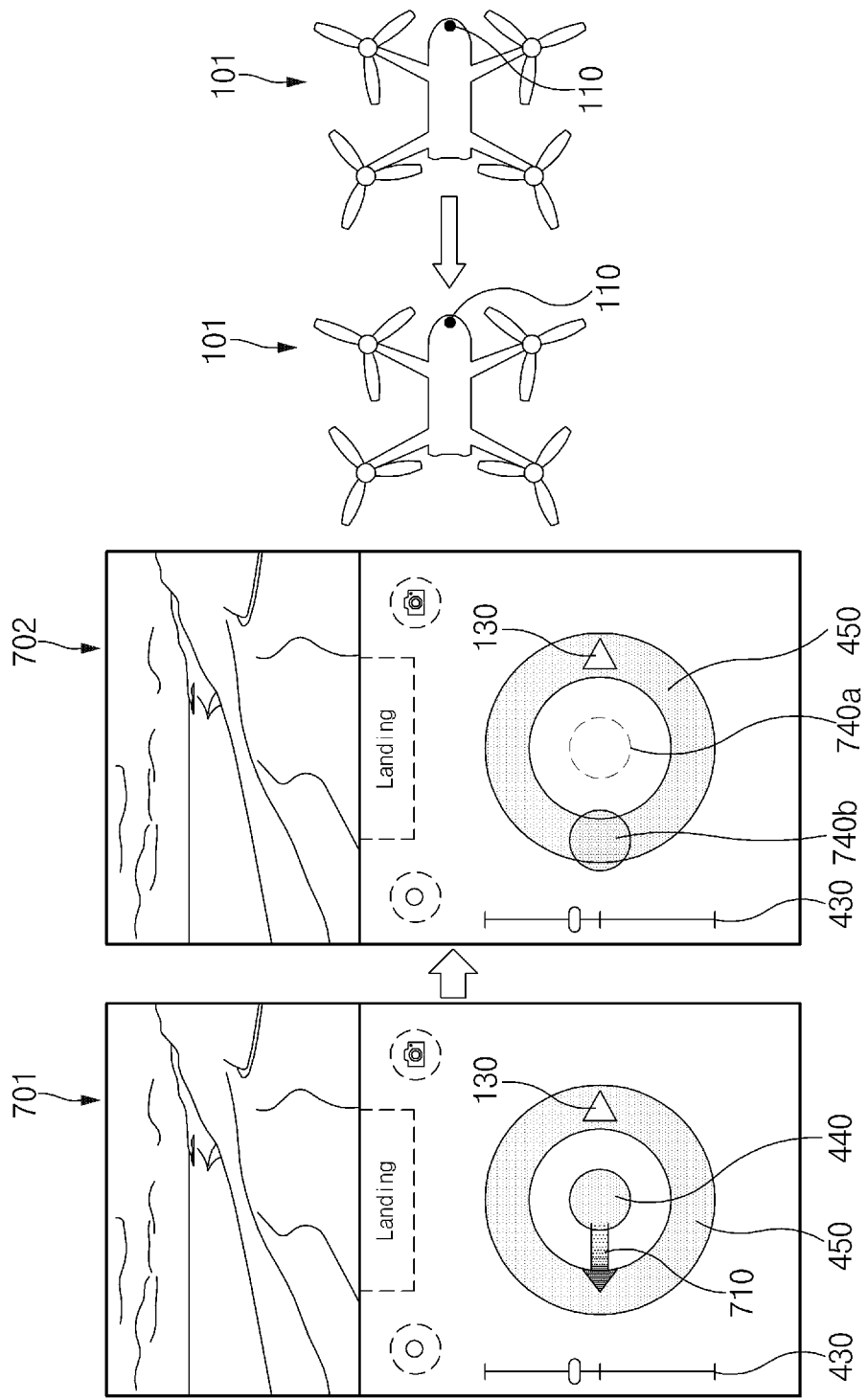
Figure 8:
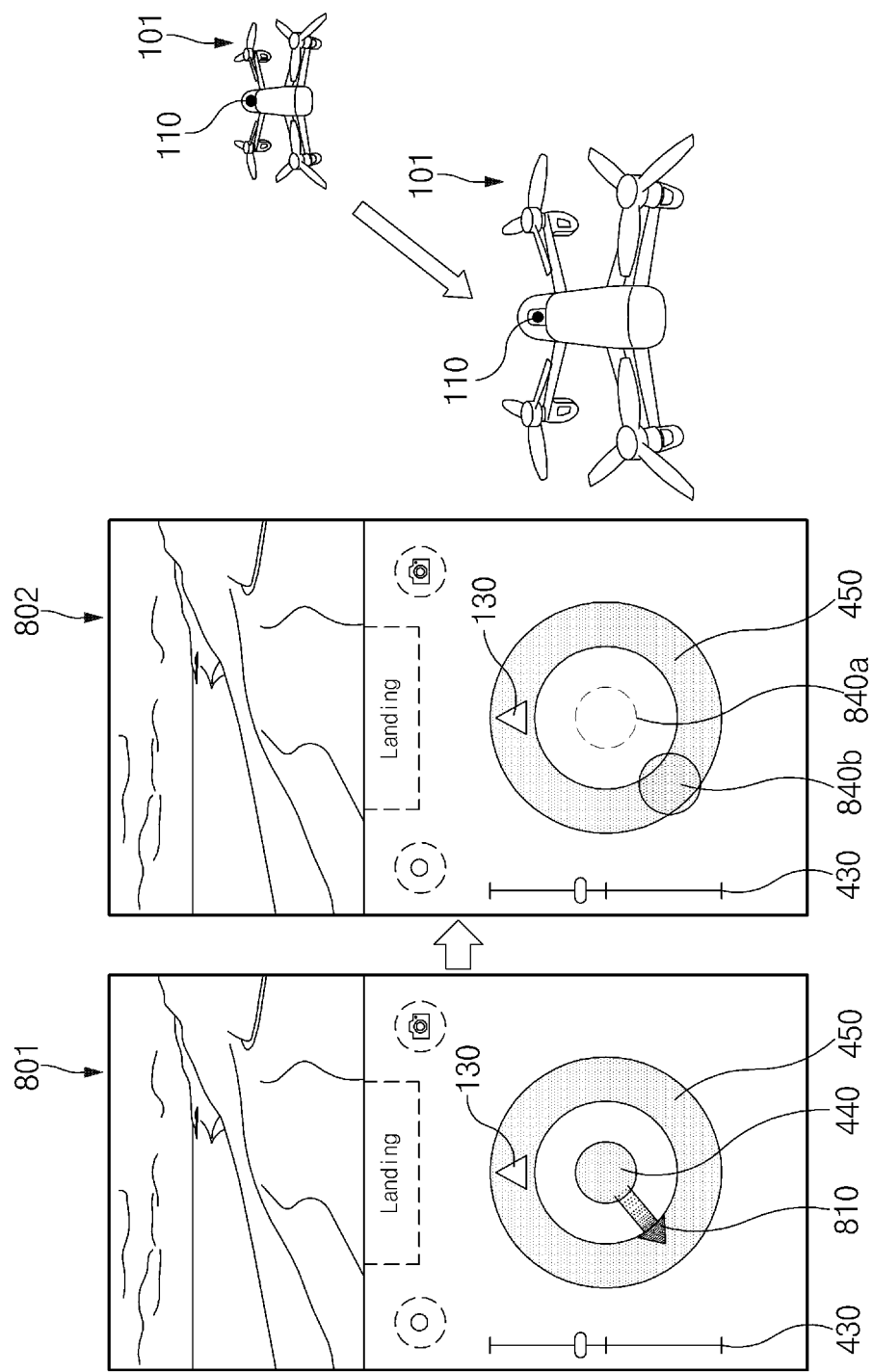

FIGS. 6 to 8 are drawings illustrating an operation of moving a UAV at the same altitude according to various embodiments of the present disclosure.

Referring to FIGS. 6 to 8, a direction UI 440 may be a circular touch button located in a rotation UI 450. If a direction UI 440 is moved on a screen by each of user inputs 610, 710, and 810, a processor of an electronic device 102 of FIG. 1 may generate a control signal including information about a movement direction (with respect to a direction indication 130), a movement speed, touch duration, or the like of the direction UI 440. The processor of the electronic device 102 may transmit the generated control signal to a UAV 101 via a communication circuit of the electronic device 102.

While maintaining the same altitude based on control information about a movement direction, a movement speed, touch duration, or the like of the direction UI 440, the UAV 101 may move in various directions such as forward movement, backward movement, or sideward movement.

For example, on a screen 601 and a screen 602 of FIG. 6, the direction UI 440 may move from a first location 640*a* to a second location 640*b* by the user input 610. The user input 610 may kept continuous on the same location as (or a location overlapped with) the direction indication 130.

The processor of the electronic device 102 may transmit a control signal (e.g., a forward movement signal) indicating that the direction UI 440 moves in the same direction as the direction indication 130 to the UAV 101. The processor of the electronic device 102 may continue transmitting the control signal while the user input 610 is maintained.

The UAV 101 may move in the same direction as a direction a direction setting point 110 faces, in a state where it maintains the same altitude, in response to a control signal received from the electronic device 102. In a state where a touch state of the user input 610 is maintained, the UAV 101 may continue moving. If the user input 610 is ended, the UAV 101 may maintain a hovering state (a location fixing state).

On a screen 701 and a screen 702 of FIG. 7, the direction UI 440 may move from a first location 740*a* to a second location 740*b* by the user input 710. The user input 610 may move in a direction opposite to the direction indication 130 and may be kept continuous.

The processor of the electronic device 102 may transmit a control signal (e.g., a backward movement signal) indicating that the direction UI 440 moves in a direction opposite to the direction indication 130 to the UAV 101. The processor of the electronic device 102 may continue transmitting the control signal while the user input 710 is maintained.

The UAV 101 may move in a direction opposite to a direction the direction setting point 110 faces, in a state where it maintains the same altitude, in response to a control signal received from the electronic device 102. In a state where a touch state of the user input 710 is maintained, the UAV 101 may continue moving. If the user input 610 is ended, the UAV 101 may maintain a hovering state (a location fixing state).

On a screen 801 and a screen 802 of FIG. 8, the direction UI 440 may move from a first location 840*a* to a second location 840*b* by the user input 810. The user input 610 may be kept continuous in a state where it forms a specified angle with the direction indication 130.

The processor of the electronic device 102 may transmit a control signal (e.g., a sideward movement signal) indicating that the direction UI 440 moves in a state where it forms a specified angle (e.g., −60 degrees) with the direction indication 130 to the UAV 101. The processor of the electronic device 102 may continue transmitting the control signal while the user input 810 is maintained.

The UAV 101 may move in a direction which forms a specified angle (e.g., −60 degrees) with the direction setting point 110, in a state where it maintains the same altitude, in response to a control signal received from the electronic device 102. In a state where a touch state of the user input 810 is maintained, the UAV 101 may continue moving. If the user input 610 is ended, the UAV 101 may maintain a hovering state (a location fixing state).

According to various embodiments, if the touch state of each of the user inputs 610, 710, and 810 is ended, the processor of the electronic device 102 may return the direction UI 440 to each of the first locations 640*a*, 740*a*, and 840*a*.

According to various embodiments, a user input on the direction UI 440 may occur concurrently with a user input on the altitude UI 430 for altitude adjustment.

Figure 10A:
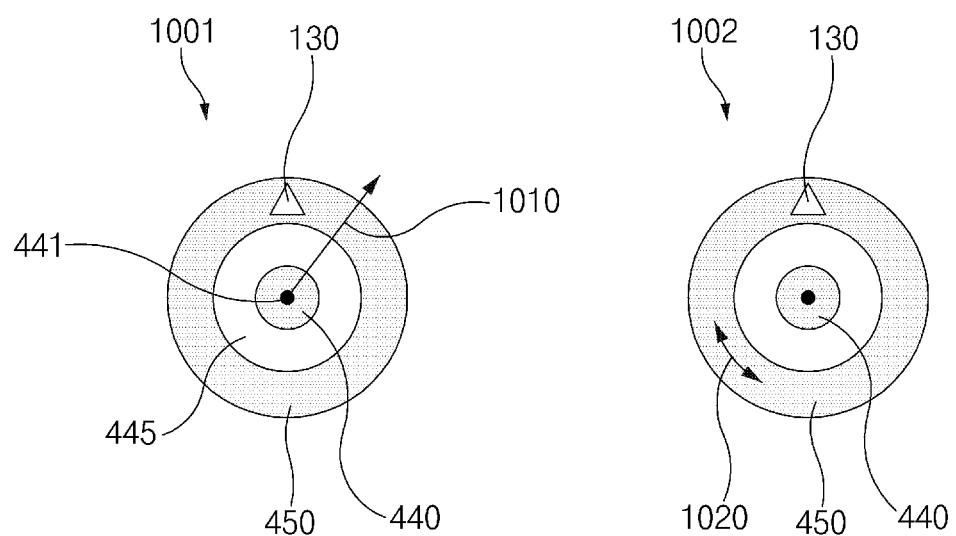
FIG. 10A is a drawing illustrating a method for generating a control signal based on a location where a user input occurs, according to various embodiments of the present disclosure.
Figure 10B:
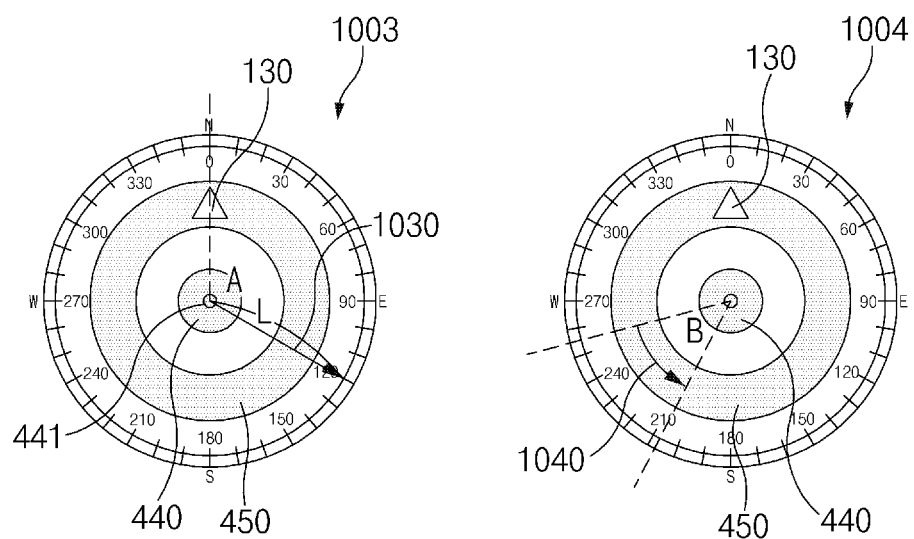
FIG. 10B is a drawing illustrating converting an angle according to a user input according to various embodiments of the present disclosure.

Additional information about calculating an angle between the direction indication and a direction of each of the user inputs 610, 710, and 810 (e.g., a direction of a slide input) may be provided with reference to FIG. 10B.

Figure 9:
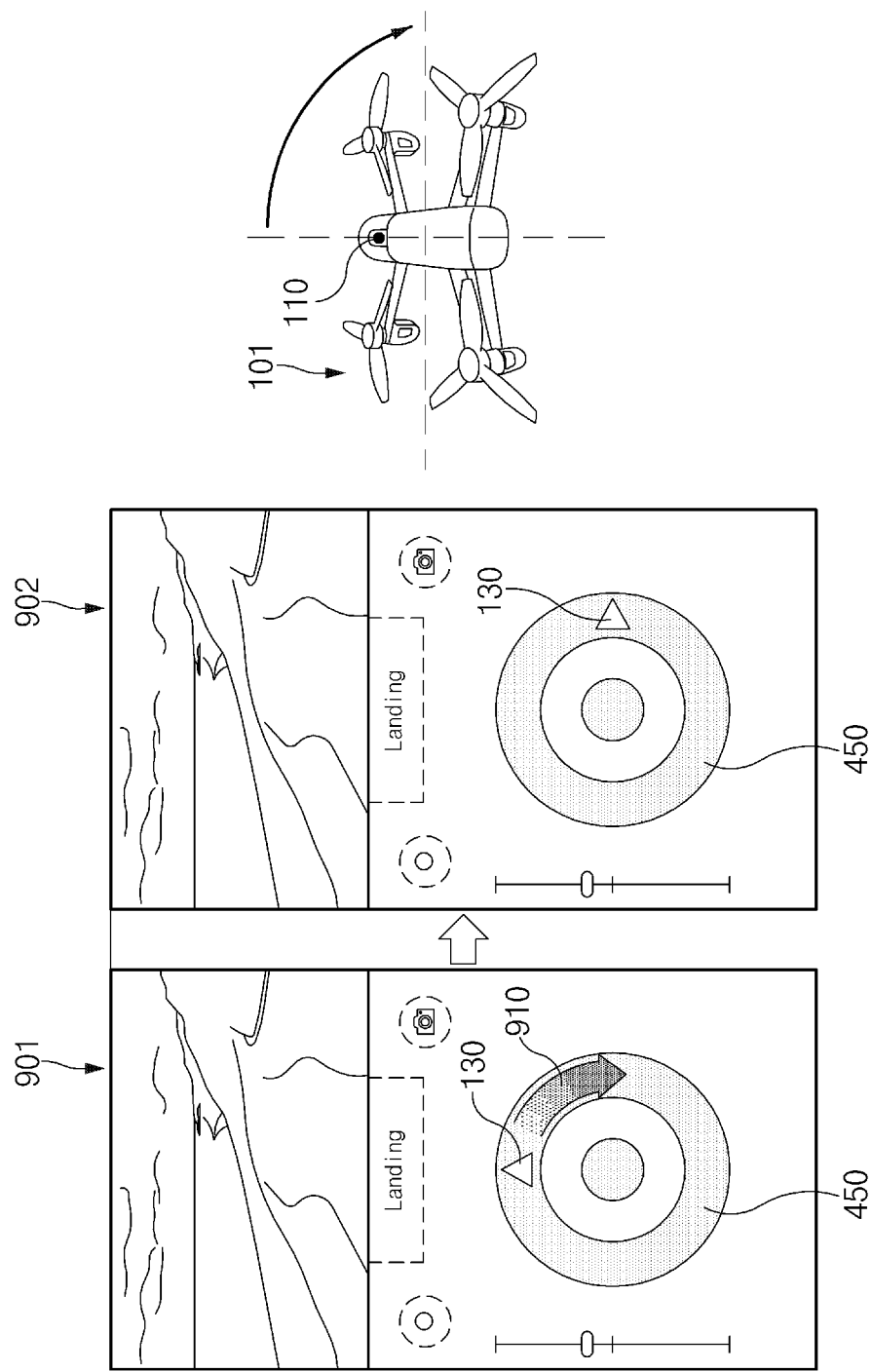
FIG. 9 is a drawing illustrating an operation of rotating a UAV at the same altitude according to various embodiments of the present disclosure.

FIG. 9 is a drawing illustrating an operation of rotating a UAV at the same altitude according to various embodiments of the present disclosure.

Referring to FIG. 9, on a screen 901 and a screen 902, a rotation UI 450 may be a touch region of a circular band form which surrounds the outside of a direction UI 440. A separation region 445 may be located between the rotation UI 450 and the direction UI 440. If a user touches part of the rotation UI 450 and generates a rotation input 910, a control signal including a direction of the rotation input 910 (with respect to a direction indication 130), a progress distance of the rotation input 910, touch duration of the rotation input 910, or the like may be generated. A processor of an electronic device 102 of FIG. 1 may transmit the generated control signal to a UAV 101.

The UAV 101 may rotate while maintaining the same altitude, in response to the information about a direction, a progress distance, touch duration, or the like of the rotation input 910.

For example, if the rotation input 910 is an input which is started from the direction indication 130 and rotates at 90 degrees in a clockwise direction, the UAV 101 may rotate at 90 degrees in the clockwise direction with respect to a direction setting point 110.

If the UAV 101 rotates, the direction setting point 110 may be changed in location. The UAV 101 may transmit the changed location information of the direction setting point 110 to the electronic device 102. The electronic device 102 may change a location of the direction indication 130 in response to the changed location information of the direction setting point 110.

In FIG. 9, an embodiment is exemplified as the rotation input 910 of the clockwise direction. However, embodiments are not limited thereto. For example, if the rotation input 910 occurs in a counterclockwise direction, the UAV 101 may rotate in the counterclockwise direction with respect to the direction setting point 110.

According to various embodiments, a user input on the rotation UI 450 may occur concurrently with a user input on an altitude UI 430 for altitude adjustment.

Information about calculating an angle of the rotation input 910 may be provided with reference to FIG. 10B.

FIG. 10A is a drawing illustrating a method for generating a control signal based on a location where a user input occurs, according to various embodiments of the present disclosure.

Referring to FIG. 10A, a processor of an electronic device 102 of FIG. 1 may generate a control signal for direction movement or rotation movement of a UAV 101 of FIG. 1 depending on a location where a touch input of a user occurs.

In a UI 1001, a direction UI 440 may be formed as a circle of a specified range (e.g., a diameter of 2 cm) around a point 441. If a movement input 1010 of the user occurs within the range and if the movement input 1010 is extended to the outside of the range, the processor of the electronic device 102 may generate a control signal based on a direction of the movement input 1010 (with respect to a direction indication 130) and a progress distance of the movement input 1010.

In the UI 1002, a rotation UI 450 may have a circular band form which surrounds the outside of the direction UI 440. A separation region 445 may be located between the rotation UI 450 and the direction UI 440. In an embodiment, if a rotation input 1020 of the user occurs on the separation region 445, the processor of the electronic device 102 may fail to generate a separate control signal. In another embodiment, if a user input occurs on the separation region 445, the processor of the electronic device 102 may determine the user input as an input on a UI relatively similar between the rotation UI 450 and the direction UI 440.

If the rotation input 1020 occurs in the rotation UI 450 and if a separate touch does not occur on the direction UI 440, the processor of the electronic device 102 may generate a control signal based on a direction and a rotation angle of the rotation input 1020 with respect to the direction indication 130.

According to an embodiment, the UAV 101 may continue rotating while the rotation input 102 of the user occurs. If the rotation input 1020 of the user is ended (if a touch input is ended), the UAV 101 may stop rotating and may enter a hovering state.

In another embodiment, the UAV 101 may maintain a hovering state until the rotation input 1020 of the user is generated and ended (until a touch input is ended). If the rotation input 1020 is ended (if the touch input is ended), the UAV 101 may rotate by reflecting a rotation angle of the rotation input 1020.

According to various embodiments, if the user touches and rotates the direction indication 130, the processor of the electronic device 102 may generate a control signal for rotating the UAV 101. If an input occurs on another region of the rotation UI 450, the processor of the electronic device 102 may fail to generate a separate control signal. In this case, the UAV 101 may maintain a hovering state.

FIG. 10B is a drawing illustrating converting an angle according to a user input according to various embodiments of the present disclosure. In FIG. 10B, an embodiment is exemplified as a direction setting point 110 of a UAV 101 faces a direction of due north. However, embodiments are not limited thereto.

Referring to FIG. 10B, in a UI 1003, if a user input 1030 occurs on a direction UI 440 and progresses in an external direction, a processor of an electronic device 102 of FIG. 1 may calculate movement angle A and movement distance L of the user input 1030 with respect to a direction indication 130.

In an embodiment, movement angle A may have a value of −180 degrees to +180 degrees. In another embodiment, movement angle A may have a value of 0 degree to 360 degrees relative to the direction indication 130.

According to various embodiments, movement distance L may have a value of a specified range (e.g., a range from a central point 441 of the direction UI 440 to an external boundary of a rotation UI 450).

If the user input 1030 occurs on the direction UI 440, the processor of the electronic device 102 may generate a control signal including information about movement angle A and movement distance L. The processor of the electronic device 102 may transmit the generated control signal to the UAV 101 via a communication circuit of the electronic device 102.

The UAV 101 may determine a direction which forms movement angle A with a direction setting point 110 of FIG. 1. The UAV 101 may move in the determined direction by a distance corresponding to movement distance L. For example, if movement distance L is 1 cm, the UAV 101 may move in a direction determined according to movement angle A by 1 m.

According to various embodiments, if movement distance L of the user input 1030 is kept continuous in a state where it maintains a maximum value (e.g., if the user input 1030 is kept continuous at a point adjacent to the rotation UI 450), the UAV 101 may continue moving in a direction determined according to movement angle A. If receiving a control signal indicating that the user input 1030 is ended, the UAV 101 may stop moving and may enter a hovering state.

In a UI 1004, if a rotation input 1040 of a user occurs on the rotation UI 450, the processor of the electronic device 102 may calculate movement angle B at a point where the rotation input 1040 occurs. For example, if the rotation input 1040 occurs in a clockwise direction, movement angle B may have a plus value. If the rotation input 1040 occurs in a counterclockwise direction, movement angle B may have a minus value.

If the rotation input 1040 occurs on the rotation UI 450, the processor of the electronic device 102 may generate a control signal including information about movement angle B. The processor of the electronic device 102 may transmit the generated control signal to the UAV 101 via the communication circuit.

The UAV 101 may rotate based on movement angle B. If movement angle B has a minus value, the UAV 101 may rotate in a counterclockwise direction with respect to the direction setting point 110 by movement angle B. On the other hand, if movement angle B has a plus value, the UAV 101 may rotate in a clockwise direction relative to the direction setting point 110 by movement angle B.

Figure 11:
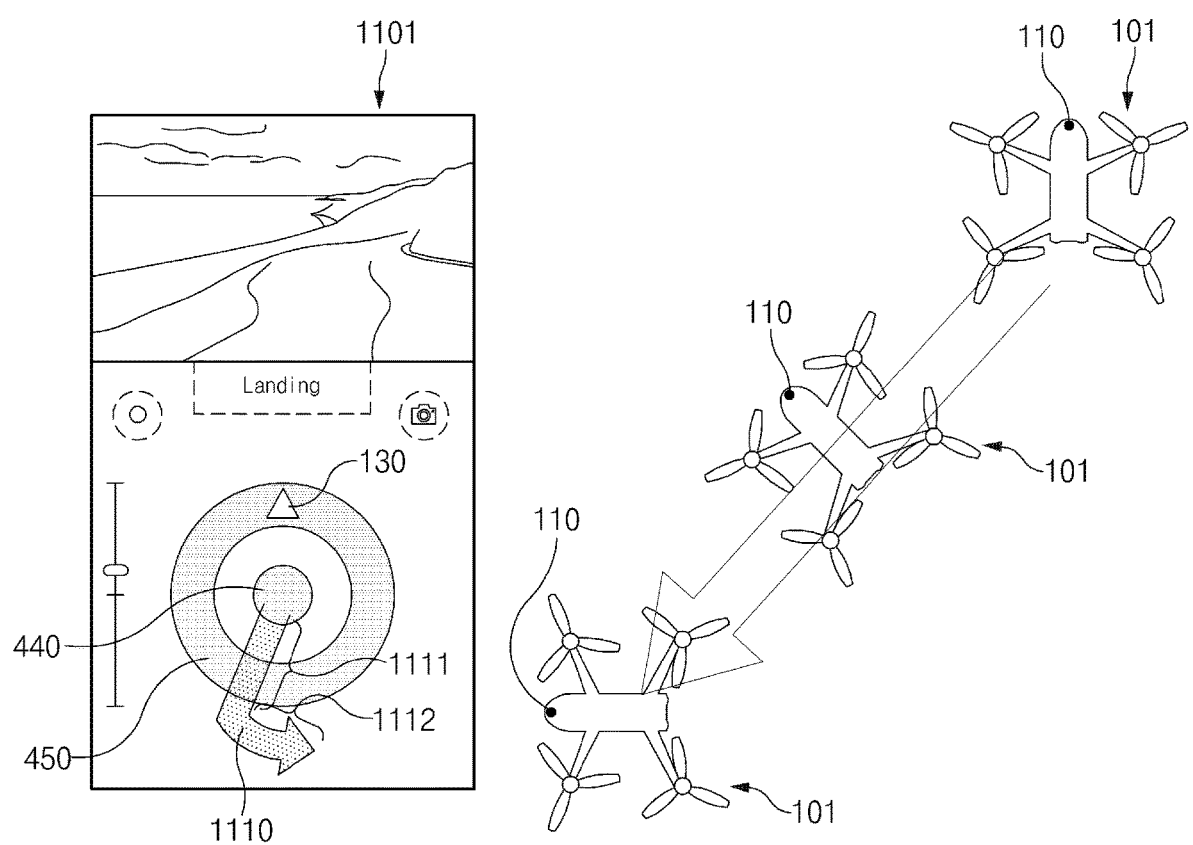
FIG. 11 is a drawing illustrating a composite input at the same altitude according to various embodiments of the present disclosure.

FIG. 11 is a drawing illustrating a composite input at the same altitude according to various embodiments of the present disclosure.

Referring to FIG. 11, on a screen 1101, a composite input 1110 of a user may be started from a rotation UI 450 and convert its direction to continue on the rotation UI 450.

By the composite input 1110 of the user, a processor of an electronic device 102 of FIG. 1 may generate a control signal for simultaneously moving and rotating a UAV 101 of FIG. 1 at the same altitude.

In response to a first portion 1111 of the composite input 1110, a direction and distance of movement motion of the UAV 101 may be determined. The first portion 1111 may be formed in an external direction (e.g., a direction the rotation UI 450 faces) from the center of the direction UI 440.

In response to a second portion 1112 of the composite input 1110, a direction and angle of rotation motion of the UAV 101 may be determined. The second portion 1112 may be a portion where a direction of an input is converted into a clockwise or counterclockwise direction while the user maintains a touch state on the first portion 1111. According to various embodiments, the second portion 1112 may have a curved or straight form.

The processor of the electronic device 102 may generate a control signal including all of 1) the direction and distance of the movement motion and 2) the direction and angle of the rotation motion. The processor of the electronic device 102 may transmit the generated control signal to the UAV 101 via a communication circuit of the electronic device 102. The UAV 101 may simultaneously perform movement motion and rotation motion depending on a control signal to be received.

Figure 12:
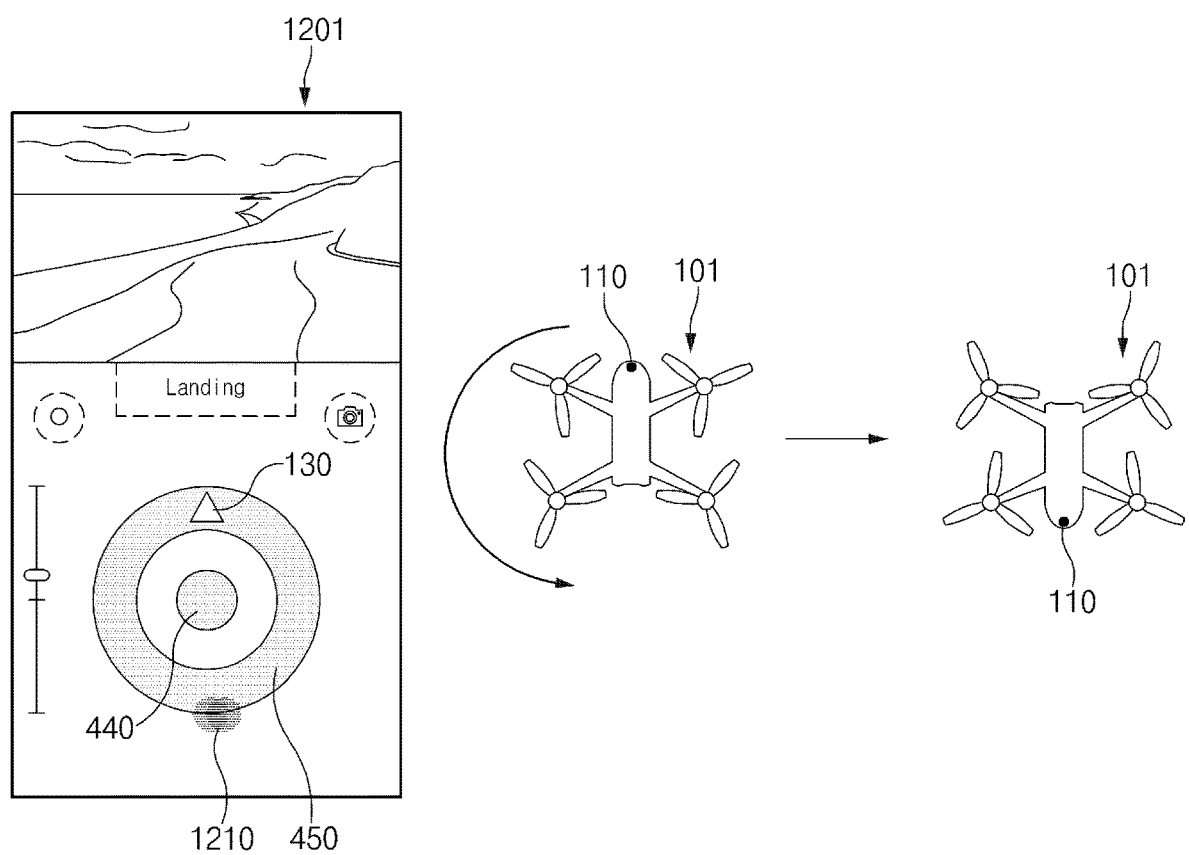
FIG. 12 is a drawing illustrating direction conversion of a UAV using a double tap input according to various embodiments of the present disclosure.

FIG. 12 is a drawing illustrating direction conversion of a UAV using a double tap input according to various embodiments of the present disclosure.

Referring to FIG. 12, if a double tap input 1210 occurs on a rotation UI 450 (or a region adjacent to the rotation UI 450 (e.g., an outer region of the rotation UI 450 or a separation region 445)) on a screen 1201, a processor of an electronic device 102 of FIG. 1 may generate a control signal for rotating a UAV 101 with respect to a direction indication 130 and a location where the double tab input 1210 occurs.

For example, if the double tap input 1210 occurs on the rotation UI 450 on a screen 1201 of an opposite direction of the direction indication 130, the processor the electronic device 102 may generate a control signal for allowing the UAV 101 to rotate at 180 degrees. The processor the electronic device 102 may transmit the generated control signal to the UAV 101 via a communication circuit of the electronic device 102. The UAV 101 may rotate at 180 degrees such that a direction setting point faces an opposite direction in response to the received control signal.

In FIG. 12, an embodiment is exemplified as the rotation of 180 degrees. However, embodiments are not limited thereto. The electronic device 102 may generate a control signal for rotating at various angles based on an angle between the direction indication 130 and a point where the double tap input 1210 occurs (see FIG. 13).

Figure 13:
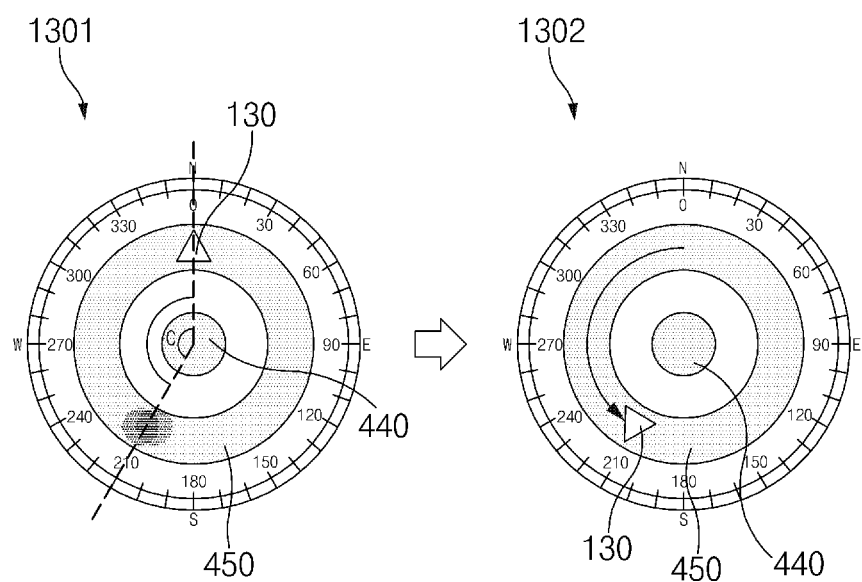
FIG. 13 is a drawing illustrating calculating an angle of a double tap input according to various embodiments of the present disclosure.

FIG. 13 is a drawing illustrating calculating an angle of a double tap input according to various embodiments of the present disclosure.

Referring to FIG. 13, in a UI 1301, if a double tap input 1210 occurs on a rotation UI 450, a processor of an electronic device 102 of FIG. 1 may generate a control signal for rotating a UAV 101 of FIG. 1.

The processor of the electronic device 102 may calculate angle C between a direction indication 130 and a point where a double tap input 1210 occurs. In an embodiment, angle C may have a value between −180 degrees and +180 degrees. For example, if the double tap input 1210 occurs on a left side of the direction indication 130, angle C may have a minus value. If the double tap input 1210 occurs on a right side of the direction indication 130, angle C may have a plus value.

The processor of the electronic device 102 may generate a control signal including information about angle C and may transmit the generated control signal to the UAV 101. The UAV 101 may rotate a direction setting point 110 of FIG. 1 in response to the received control signal.

For example, if angle C has a minus value, the UAV 101 may rotate in a counterclockwise direction. On the other hand, if angle C has a plus value, the UAV 101 may rotate in a clockwise direction.

In a UI 1302, if a direction the direction setting point faces is changed by rotation of the UAV 101, the processor of the electronic device 102 may change a location of the direction indication 130 in response to the changed direction. For example, the direction indication 130 may be changed to a state where it faces a point where the double tap input 1210 occurs.

Figure 14:
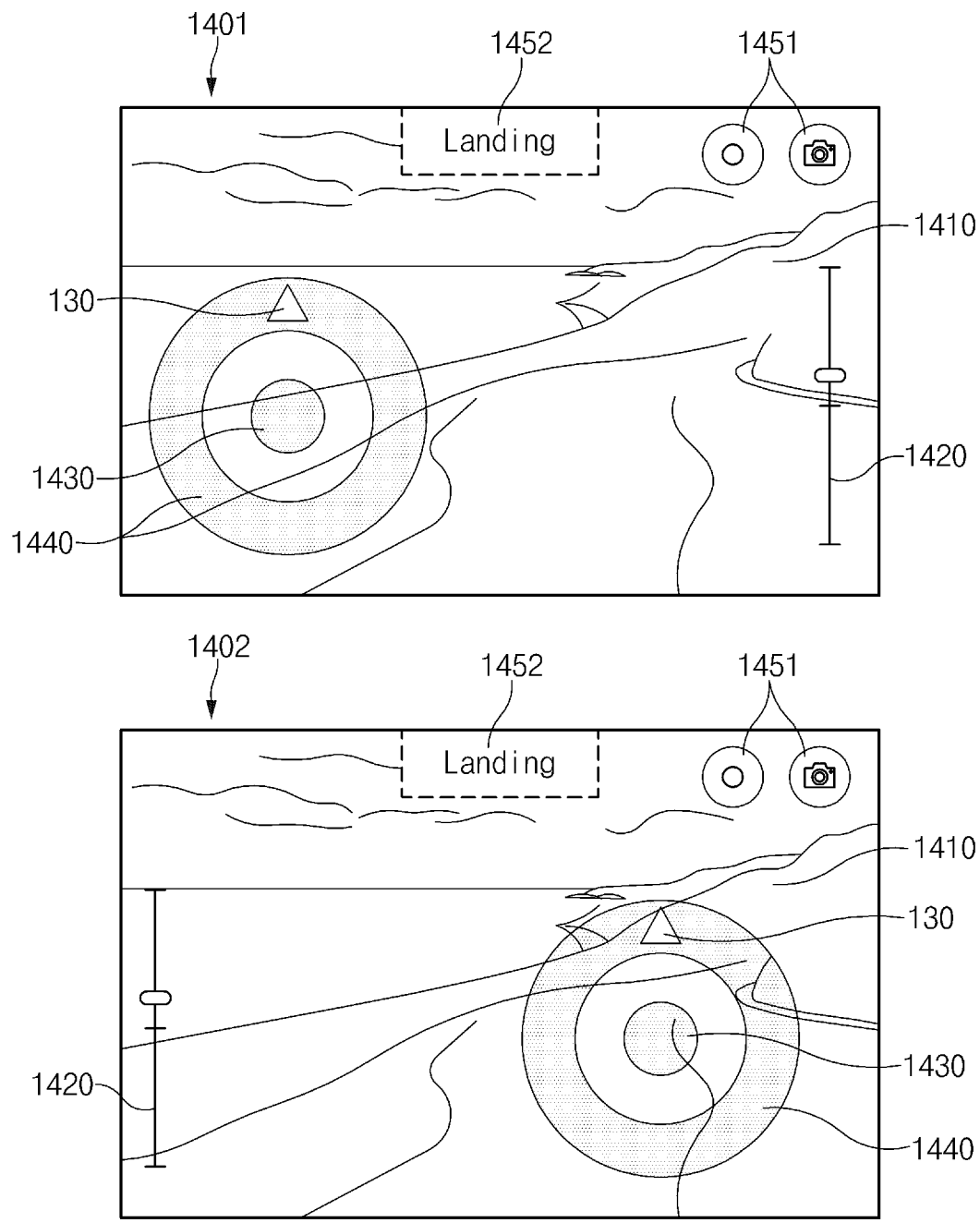
FIG. 14 is a drawing illustrating a control interface in a landscape mode of a display according to various embodiments of the present disclosure.

FIG. 14 is a drawing illustrating a control interface in a landscape mode of a display according to various embodiments of the present disclosure.

Referring to FIG. 14, a control interface 1401 may include a capture image (or a live view) 1410 output as a background image on the entire region. The control interface 1401 may include an altitude UI 1420, a direction UI 1430, and a rotation UI 1440 in the capture image 1410. The control interface 1401 may include a direction indication 130 corresponding to a direction setting point 110 of a UAV 101 of FIG. 1.

Compared with a portrait mode (FIG. 4), a user may control the UAV 101 using his or her both hands. For example, the user may operate the altitude UI 430 using his or her right hand and may operate the direction UI 440 and the rotation UI 150 using his or her left hand.

In addition, the control interface 1401 may include an interface 1451 (e.g., a video capture button or a still image capture button) associated with capturing a photo or video, an interface (e.g., a landing button 1452) associated with starting/ending flight, or the like.

Compared with the control interface 1401, a control interface 1402 may include the altitude UI 1420 located at a left side of a screen and may include the direction UI 1430 and the rotation UI 1440 located at a right side of the screen. The altitude UI 1420, the direction UI 1430, and the rotation UI 1440 may be changed in arrangement location according to a user setting or an automatic setting. The user may change a location of each of the altitude UI 1420, the direction UI 1430, and the rotation UI 1440 in a form he or she wants.

Figure 15:
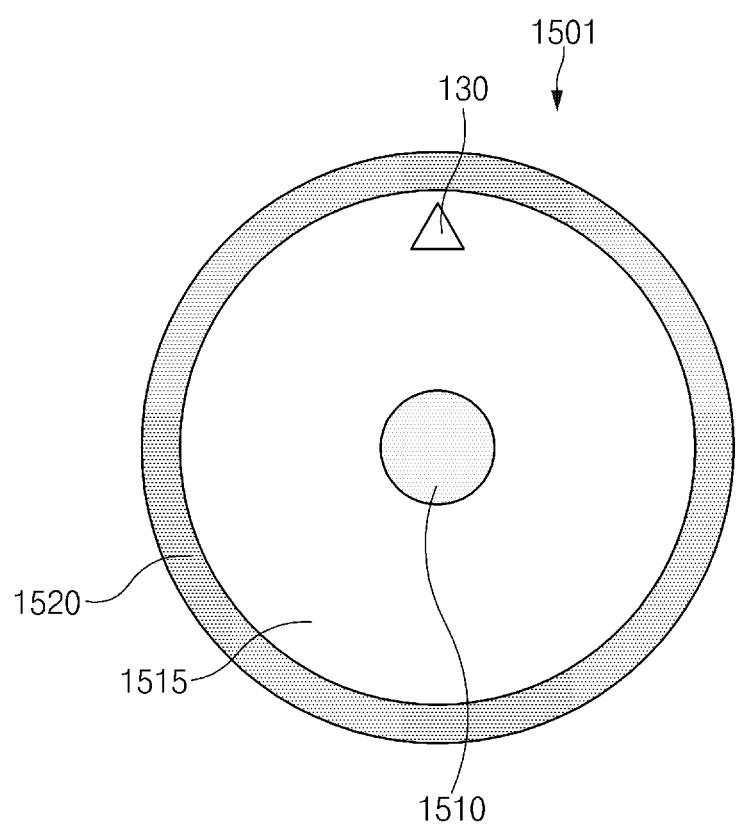
FIG. 15 is a drawing illustrating an electronic device having a circular display according to various embodiments of the present disclosure.

FIG. 15 is a drawing illustrating an electronic device having a circular display according to various embodiments of the present disclosure.

Referring to FIG. 15, an electronic device which operates a UAV 101 of FIG. 1 may include a circular display 1501. A processor of the electronic device may display a direction UI 1510, a rotation UI 1520, and a direction indication 130 (corresponding to a direction setting point 110 of the UAV 101) on the circular display 1501. A separation region 1515 may be located between the direction UI 1510 and the rotation UT 1520. A method of operating the direction UI 1510 and the rotation UI 1520 may be the same or similar to a method of operating a direction UI 440 and a rotation UI 450 in FIG. 4.

According to various embodiments, the rotation UI 1520 may be implemented with a rotary bezel which surrounds the circular display 1501, rather than a touch region. A user may generate a rotation input by physically rotating the bezel rather than a touch input manner.

According to various embodiments, if a multi-touch input occurs on the circular display 1501, the processor may display a UI indicating altitude adjustment of the UAV 101 on the circular display 1501. For example, if a zoom-out input occurs on the circular display 1501, the processor may display an altitude UI (not shown) of a rod form on the circular display 1501. In response to a progress distance of the zoom-out input, the processor may generate a control signal for lowering an altitude of the UAV 101. On the other hand, if a zoom-in input occurs on the circular display 1501, the processor may generate a control signal for gaining an altitude of the UAV 101.

Figure 16:
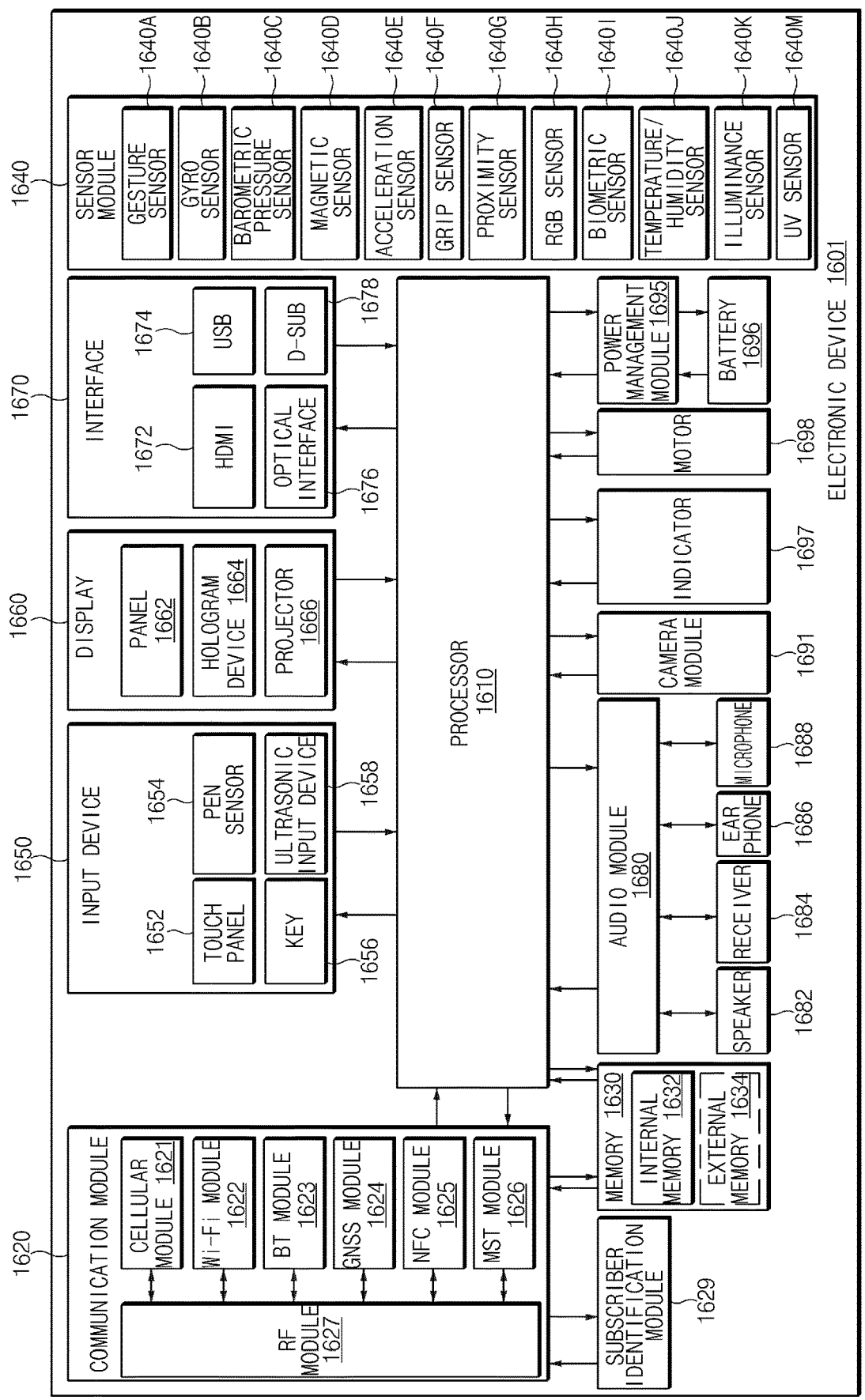
FIG. 16 is a block diagram illustrating a configuration of an electronic device according to various embodiments of the present disclosure.

FIG. 16 is a block diagram illustrating an electronic device according to an embodiment of the present disclosure of the present disclosure.

Referring to FIG. 16, an electronic device 1601 may include, for example, a part or the entirety of the electronic device 102 illustrated in FIG. 1. The electronic device 1601 may include at least one processor (e.g., AP) 1610, a communication module 1620, a subscriber identification module (SIM) 1629, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may run an operating system or an application program so as to control a plurality of hardware or software elements connected to the processor 1610, and may process various data and perform operations. The processor 1610 may be implemented with, for example, a system on chip (SoC). According to an embodiment of the present disclosure, the processor 1610 may further include a graphic processing unit (GPU) and/or an image signal processor. The processor 1610 may include at least a portion (e.g., a cellular module 1621) of the elements illustrated in FIG. 16. The processor 1610 may load, on a volatile memory, an instruction or data received from at least one of other elements (e.g., a nonvolatile memory) to process the instruction or data, and may store various data in a nonvolatile memory.

The communication module 1620 may include, for example, a cellular module 1621, a Wi-Fi module 1622, a BT module 1623, a GNSS module 1624 (e.g., a GPS module, a GLONASS module, a BeiDou module, or a Galileo module), a NFC module 1625, a MST module 1626 and a radio frequency (RF) module 1627.

The cellular module 1621 may provide, for example, a voice call service, a video call service, a text message service, or an Internet service through a communication network. The cellular module 1621 may identify and authenticate the electronic device 1601 in the communication network using the subscriber identification module 1629 (e.g., a SIM card). The cellular module 1621 may perform at least a part of functions that may be provided by the processor 1610. The cellular module 1621 may include a CP.

Each of the Wi-Fi module 1622, the BT module 1623, the GNSS module 1624 and the NFC module 1625 may include, for example, a processor for processing data transmitted/received through the modules, According to some various embodiments of the present disclosure, at least a part (e.g., two or more) of the cellular module 1621, the Wi-Fi module 1622, the Bluetooth module 1623, the GNSS module 1624, and the NFC module 1625 may be included in a single integrated chip (IC) or IC package.

The RF module 1627 may transmit/receive, for example, communication signals (e.g., RF signals). The RF module 1627 may include, for example, a transceiver, a power amp module (PAM), a frequency filter, a low noise amplifier (LNA), an antenna, or the like. According to another embodiment of the present disclosure, at least one of the cellular module 1621, the Wi-Fi module 1622, the Bluetooth module 1623, the GNSS module 1624, or the NFC module 1625 may transmit/receive RF signals through a separate RE module.

The SIM 1629 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1630 may include, for example, an internal memory 1632 or an external memory 1634. The internal memory 1632 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1634 may include a flash drive such as a compact flash (CF), a secure digital (SD), a Micro-SD, a Mini-SD, an extreme digital (xD), a MultiMediaCard (MMC), a memory stick, or the like. The external memory 1634 may be operatively and/or physically connected to the electronic device 1601 through various interfaces.

The sensor module 1640 may, for example, measure physical quantity or detect an operation state of the electronic device 1601 so as to convert measured or detected information into an electrical signal. The sensor module 1640 may include, for example, at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640B (e.g., a red/green/blue (RGB) sensor), a biometric sensor 1640, a temperature/humidity sensor 1640J, an illumination sensor 1640K, or an ultraviolet (UV) sensor 1640M. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In some various embodiments of the present disclosure, the electronic device 1601 may further include a processor configured to control the sensor module 1640 as a part of the processor 1610 or separately, so that the sensor module 1640 is controlled while the processor 1610 is in a sleep state.

The input device 1650 may include, for example, a touch panel 1652, a (digital) pen sensor 1654, a key 1656, or an ultrasonic input device 1658. The touch panel 1652 may employ at least one of capacitive, resistive, infrared, and ultraviolet sensing methods. The touch panel 1652 may further include a control circuit. The touch panel 1652 may further include a tactile layer so as to provide a haptic feedback to a user.

The (digital) pen sensor 1654 may include, for example, a sheet for recognition which is a part of a touch panel or is separate. The key 1656 may include, for example, a physical button, an optical button, or a keypad. The ultrasonic input device 1658 may sense ultrasonic waves generated by an input tool through a microphone 1688 so as to identify data corresponding to the ultrasonic waves sensed.

The display 1660 may include a panel 1662, a hologram device 1664, or a projector 1666. The panel 1662 may be, for example, flexible, transparent, or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an embodiment of the present disclosure, the display 1660 may further include a control circuit for controlling the panel 1662, the hologram device 1664, or the projector 1666.

The interface 1670 may include, for example, a high Definition Multimedia Interface (HDMI) 1672, a USB 1674, an optical interface 1676, or a D-subminiature (D-sub) 1678. Additionally or alternatively, the interface 1670 may include, for example, a mobile high-definition link (MHL) interface, an SD card/MMC interface, or an infrared data association (IrDA) interface.

The audio module 1680 may convert, for example, a sound into an electrical signal or vice versa. The audio module 1680 may process sound information input or output through a speaker 1682, a receiver 1684, an earphone 1686, or the microphone 1688.

The camera module 1691 is, for example, a device for shooting a still image or a video. According to an embodiment of the present disclosure, the camera module 1691 may include at least one image sensor (e.g., a front sensor or a rear sensor), a lens, an image signal processor (ISP), or a flash (e.g., a light-emitting diode (LED) or a xenon lamp).

The power management module 1695 may manage power of the electronic device 1601. According to an embodiment of the present disclosure, the power management module 1695 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, or an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device for controlling an UAV includes a communication circuit configured to transmit and receive wireless data with the UAV, a display configured to display a UI for operating the UAV, a memory and a processor electrically coupled with the communication circuit, the display, and the memory, wherein the processor is configured to receive information about a direction of a first point of the UAV from the UAV, display a direction indication object corresponding to the direction of the first point on the display, in response to receiving a user input associated with movement or rotation of the UAV, generate a control signal for moving or rotating the UAV with respect to the first point in response to a location of the direction indication object and the user input, and transmit the generated control signal to the UAV using the communication circuit.

According to various embodiments, the processor is configured to display a circular first UI, for controlling movement or rotation at the same altitude of the UAV, on the display.

According to various embodiments, the first user interface comprises a direction UI for controlling movement at the same altitude of the UAV, and a rotation UI of a circular band form which surrounds the direction UI.

According to various embodiments, the direction indication object is displayed to be overlapped with the rotation UI or is displayed on the outside of the rotation UI.

According to various embodiments, the processor is configured to, if a touch input of a user occurs on the direction UI, generate a control signal for adjusting movement at the same altitude of the UAV based on a movement direction and a movement distance of the touch input.

According to various embodiments, the processor is configured to determine the movement direction based on a location of the direction indication object and a direction in which the touch input is extended.

According to various embodiments, the processor is configured to, if a touch input of a user occurs on the rotation UI, generate a control signal for adjusting rotation at the same altitude of the UAV based on a movement angle of the touch input on the center of the rotation UI.

According to various embodiments, the processor is configured to, if a double tap input occurs on the rotation UI or a point adjacent to the rotation UI, generate a control signal for adjusting rotation at the same altitude of the UAV based on an angle between the direction indication object and a point where the double tap input occurs, on the center of the rotation UI.

According to various embodiments, the processor is configured to, if a user input started from the direction UI is extended to the rotation UI and if the user input is changed in progress direction on the rotation UI, generate a control signal for adjusting movement and rotation at the same altitude of the UAV.

According to various embodiments, the processor is configured to display a second UI for controlling an altitude of the UAV on a region around the first UI.

According to various embodiments, the second UI has a bar form extended in an upper and lower direction, at a left or right side of the first UI and comprises a movement object movable by a touch input of a user.

According to various embodiments, the electronic device further includes a rotary bezel configured to surround the display, wherein the processor is configured to display a direction UI, for controlling movement at the same altitude of the UAV, on the display. The processor is configured to generate a control signal for adjusting rotation at the same altitude of the UAV based on a rotation direction and a rotation angle of the rotary bezel. The processor is configured to if a multi-touch input occurs on the display, generate a control signal for adjusting an altitude of the UAV based on the multi-touch input. The processor is configured to if a zoom-out input occurs, generate a control signal for gaining an altitude of the UAV. The processor is configured to if a zoom-in input occurs, generate a control signal for lowering an altitude of the UAV.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a non-transitory computer-readable storage medium in the form of a program module. In the case where the instructions are performed by a processor, the processor may perform functions corresponding to the instructions. The non-transitory computer-readable storage medium may be, for example, the memory.

A non-transitory computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a read only memory (ROM), a random access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for controlling an unmanned aerial vehicle (UAV), the electronic device comprising:
a communication circuit configured to transmit and receive wireless data with the UAV;
a display configured to display a user interface (UI) for operating the UAV;
a memory; and
a processor configured to:
receive information about a direction of a first point of the UAV from the UAV,
display a direction indication object corresponding to the direction of the first point on the display,
display a first UI for controlling movement or rotation at a same altitude of the UAV on the display, wherein the first UI comprises a direction UI and a rotation UI which surrounds the direction UI,
in response to receiving a first user input on the direction UI, generate a first control signal for moving the UAV with respect to the first point,
in response to receiving a second user input on the rotation UI, generate a second control signal for rotating the UAV with respect to the first point, and
transmit the generated first control signal or the generated second control signal to the UAV using the communication circuit.

2. The electronic device of claim 1, wherein the processor is configured to:
generate the first control signal based on a location of the direction indication object and the first user input; and
generate the second control signal based on the location of the direction indication object and the second user input.

3. The electronic device of claim 1, wherein the rotation UI is a circular band.

4. The electronic device of claim 1, wherein the direction indication object is displayed to be overlapped with the rotation UI or is displayed on the outside of the rotation UI.

5. The electronic device of claim 1, wherein the processor is configured to:
generate the first control signal for adjusting movement at the same altitude of the UAV based on a movement direction and a movement distance of the first input.

6. The electronic device of claim 5, wherein the processor is configured to:
determine the movement direction based on a direction in which the first input is extended.

7. The electronic device of claim 1, wherein the processor is configured to:
generate the second control signal for adjusting rotation at the same altitude of the UAV based on a movement angle of the second input on the center of the rotation UI.

8. The electronic device of claim 1, wherein the processor is configured to:
if a double tap input occurs on the rotation UI or a point adjacent to the rotation UI, generate a control signal for adjusting rotation at the same altitude of the UAV based on an angle between the direction indication object and a point where the double tap input occurs, on the center of the rotation UI.

9. The electronic device of claim 1, wherein the processor is configured to:
if a third user input started from the direction UI is extended to the rotation UI and if the third user input is changed in progress direction on the rotation UI, generate a third control signal for adjusting movement and rotation at the same altitude of the UAV.

10. The electronic device of claim 1, wherein the processor is configured to:
display a second UI for controlling an altitude of the UAV on a region around the first UI.

11. The electronic device of claim 10, wherein the second UI has a bar form extended in an upper and lower direction, at a left or right side of the first UI and comprises a movement object movable by a touch input of a user.

12. The electronic device of claim 1, further comprising:
a rotary bezel configured to surround the display,
wherein the processor is configured to display a direction UI, for controlling movement at the same altitude of the UAV, on the display.

13. The electronic device of claim 12, wherein the processor is configured to:

generate the second control signal based on a rotation direction and a rotation angle of the rotary bezel.

14. The electronic device of claim 12, wherein the processor is configured to:
if a multi-touch input occurs on the display, generate a fourth control signal for adjusting an altitude of the UAV based on the multi-touch input.

15. The electronic device of claim 14, wherein the processor is configured to:
if a zoom-out input occurs, generate a fifth control signal for gaining an altitude of the UAV.

16. The electronic device of claim 14, wherein the processor is configured to:
if a zoom-in input occurs, generate a sixth control signal for lowering an altitude of the UAV.

17. A method performed in an electronic device for controlling a UAV, the method comprising:
receiving, by a processor of the electronic device, information about a direction of a first point of the UAV from the UAV using a communication circuit of the electronic device;
displaying, by the processor, a direction indication object corresponding to the direction of the first point on a display of the electronic device;
displaying, by the processor, a first UI for controlling movement or rotation at a same altitude of the UAV on the display, wherein the first UI comprises a direction UI and a rotation UI which surrounds the direction UI on the display,
receiving, by the processor, a first user input on the on the direction UI or a second user input on the rotation UI;
generating, by the processor, a first control signal for moving the UAV with respect to the first point in response to the first user input, or a second control signal for rotating the UAV with respect to the first point in response to the second user input; and
transmitting, by the processor, the generated first control signal or the generated second control signal to the UAV using the communication circuit.

18. The method of claim 17, wherein the generating the first control signal comprises:
generating the first control signal based on the first user input and a location of the direction indication object on the display.

19. The method of claim 17, wherein the generating the second control signal comprises:
generating the second control signal based on the second user input and a location of the direction indication object on the display.

20. The method of claim 17, wherein the rotation UI is a circular band form.

* * * * *